US006493349B1

(12) United States Patent
Casey

(10) Patent No.: US 6,493,349 B1
(45) Date of Patent: *Dec. 10, 2002

(54) EXTENDED INTERNET PROTOCOL VIRTUAL PRIVATE NETWORK ARCHITECTURES

(75) Inventor: Liam M. Casey, Ottawa (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,142

(22) Filed: Nov. 13, 1998

(51) Int. Cl.[7] ............................................... H04L 12/56
(52) U.S. Cl. ...................................... 370/409; 370/466
(58) Field of Search ............................... 370/466, 467, 370/469, 389, 392, 395, 396, 397, 400, 401

(56) References Cited

U.S. PATENT DOCUMENTS

| | | | | |
|---|---|---|---|---|
| 5,768,271 A | * | 6/1998 | Seid et al. ................. | 370/389 |
| 5,825,772 A | * | 10/1998 | Dobbins et al. ............ | 370/396 |
| 5,959,990 A | * | 9/1999 | Frantz et al. ............... | 370/392 |
| 5,999,536 A | | 12/1999 | Kawafuji | |
| 6,047,330 A | * | 4/2000 | Stracke, Jr. ................. | 709/238 |
| 6,079,020 A | * | 6/2000 | Liu ............................. | 713/201 |
| 6,205,488 B1 | * | 3/2001 | Casey et al. ................. | 709/238 |

* cited by examiner

Primary Examiner—Hassan Kizou
Assistant Examiner—Minh A
(74) Attorney, Agent, or Firm—Gibbons, Del Deo, Dolan, Griffinger & Vecchione

(57) ABSTRACT

A virtual private network infrastructure is provided which enables private network communications over a shared network. The infrastructure includes a shared network partitioned into at least two separate areas. A first router is connected to a first area and configured to distribute first router VPN information across the first area. The first router VPN information includes a VPN identifier which is assigned to the first router. It also includes a second router connected between the first area and a second area which is configured to distribute second router VPN information across the first area. The second router VPN information includes a VPN identifier which is assigned to the second router which is the same VPN identifier assigned to the first router.

A method of configuring a virtual private network infrastructure is also provided which enables private network communications over a shared network. The method includes partitioning a shared network into multiple areas and connecting a virtual router between at least two of the areas. A VPN identifier is assigned to the virtual router. A link is created between a first private network router and a first shared network router which is connected to a first area. The VPN identifier assigned to the virtual router is also assigned to the first shared network router and the VPN identifier is communicated between the first shared network router and the virtual router.

18 Claims, 3 Drawing Sheets

EXTENDED INTERNET PROTOCOL VIRTUAL PRIVATE NETWORK ARCHITECTURES

FIELD OF THE INVENTION

The invention relates generally to the field of virtual private networks and more particularly, to partitioning shared network infrastructure into multiple distinct virtual private network areas.

BACKGROUND OF THE INVENTION

With the growing popularity of the Internet and networks in general, there is a trend towards centralized network services and centralized network Service Providers (providers). To be profitable, however, providers need to constantly maintain and if possible enlarge their customer base and their profits. Since leased line services are coming under increased competition, profit margins have been decreasing for these providers. Thus, an increased number of providers are trying to attract small and medium sized businesses by providing centralized network management. In accordance with this goal, they are offering Virtual Private Networks (VPNs) to interconnect various customer sites (private networks) which are geographically dispersed. One such service is an Internet Protocol (IP) VPN which interconnects geographically dispersed private IP networks over the provider's shared network facilities.

The general goal of an IP VPN is to offer privacy and performance on par with leased line interconnectivity while realizing substantial deployment efficiencies due to the shared network infrastructure. The term "provider" includes the public carrier, network operator or Internet Provider ("ISP"), or consortiums thereof, who operate the shared network infrastructure and offer the IP VPN service. The shared network structure will also be referred to as the base network of the VPN. VPNs are of great interest to both providers and to their customers because they offer privacy and cost efficiency through network infrastructure sharing. There has been difficulty providing this service, however, due to address conflicts, security problems, scalability issues and performance problems.

Others have attempted to offer this service over a single instance of a shared network, however, a single instance of a shared network is not suitably scalable. Most networks do not have the ability to handle very large numbers of VPNs due to the amount of traffic and links required.

Accordingly there exists the need for a system which provides a scalable VPN infrastructure.

There also exists the need for a system which allows an IP VPN Provider to partition the shared network based upon implementation choices.

There exists the need for a system which enables various Providers to jointly provide IP VPN service over various subnetworks.

It is accordingly an object of the present invention to provide a system which provides a scalable VPN infrastructure.

It is another object of the invention to provide a system which allows an IP VPN Provider to partition the shared network based upon implementation choices.

It is still another object of the invention to provide a system which enables various Providers to jointly provide IP VPN service over various subnetworks.

These and other objects of the invention will become apparent to those skilled in the art from the following description thereof.

SUMMARY OF THE INVENTION

It has now been discovered that these and other objects may be accomplished by the present virtual private network infrastructure which enables private communications over a shared network, between at least two geographically separate private networks. The present invention includes a shared network partitioned into at least two distinct areas. It includes a first router connected to a first area and configured to distribute first router VPN information across the first area. The first router VPN information includes a VPN identifier which is assigned to the first router. The system also includes a second router connected between the first area and a second area which is configured to distribute second router VPN information across the first area. The second router VPN information includes a VPN identifier which is assigned to the second router. The VPN identifier assigned to the first router is the same as the VPN identifier assigned to the second router.

In an embodiment of the invention, the virtual private network infrastructure includes a shared network partitioned into at least two distinct areas. It includes first router means connected to a first area for dynamically distributing first router means VPN information across the first area and second router means connected between the first area and a second area for dynamically distributing second router means VPN information across the first and second areas. The first and second router means VPN information includes a VPN identifier which is assigned to said first and second router means respectively. The VPN identifier assigned to the first router means is the same as the VPN identifier assigned to the second router means.

In another embodiment, the invention includes a method of configuring a virtual private network infrastructure which enables private network communications over a shared network. The method includes partitioning a shared network into two or more areas. It also includes connecting a virtual router between at least two of the areas and assigning at least one VPN identifier to the virtual router. The method includes creating a link between a first private network router and a first shared network router, such that the first shared network router is connected to a first area. It also includes assigning the same VPN identifier assigned to the virtual router to the first shared network router; and communicating the VPN identifier between the first shared network router and the virtual router.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

DETAILED DESCRIPTION OF THE INVENTION

A VPN is a group of individual private networks logically connected through one or more shared networks. VPNs are formed by distributing VPN information throughout the shared network(s), and forming tunnels between VPN routers which are members of a common VPN.

An IP VPN service includes the routing of IP network traffic by the provider over the shared network(s) based upon its IP destination address. Benefits of an IP VPN include simplified configuration of edge routers (also referred to herein as shared network routers and border routers), and the wide acceptance and adoption of IP service for connecting private networks to provider points of presence (POPs).

There are a number of generic operations performed in IP VPN services including: VPN membership discovery, the process by which provider nodes learn of the other nodes serving the same VPN; and tunnel establishment, the process of providing private paths across the base network for each private network's data. Both of these operations are well known and thus will not be described herein. When offering an IP service the provider participates in the private network's routing regime. Nodes in the private network exchange reachability information with nodes in the provider's network via the "stub" link reachability information exchange process. The provider nodes serving a particular VPN propagate this reachability information to each other to enable them to route the communication packets. This is the Intra VPN reachability exchange.

VPN "areas" are formed by partitioning a provider's shared network infrastructure. Within a VPN area various VPN mechanisms (i.e. base network, tunneling, VPN membership discovery etc.) are the same. Between two or more VPN areas the VPN mechanisms can be different; although they are not required to be. VPN areas allow an IP VPN provider to partition the shared network based upon IP VPN implementation choices. For example, a provider may have Multi-Protocol Label Switching (MPLS) in the backbone part of the shared network but not in all regional networks (See FIG. 3). The Provider can operate a MPLS based IP VPN area in the backbone, as described, while using other forms of IP VPN technology (e.g. IP over Frame Relay, IP over leased lines, IP over Local Area Network Emulation (LANE), IP over IP, IP over GRE, IP over L2TP, IP over IPSec, IP over ethernet or any other conventional IP tunneling technology) in the regional VPN areas or it could employ one of these others as the backbone.

Figure 3:
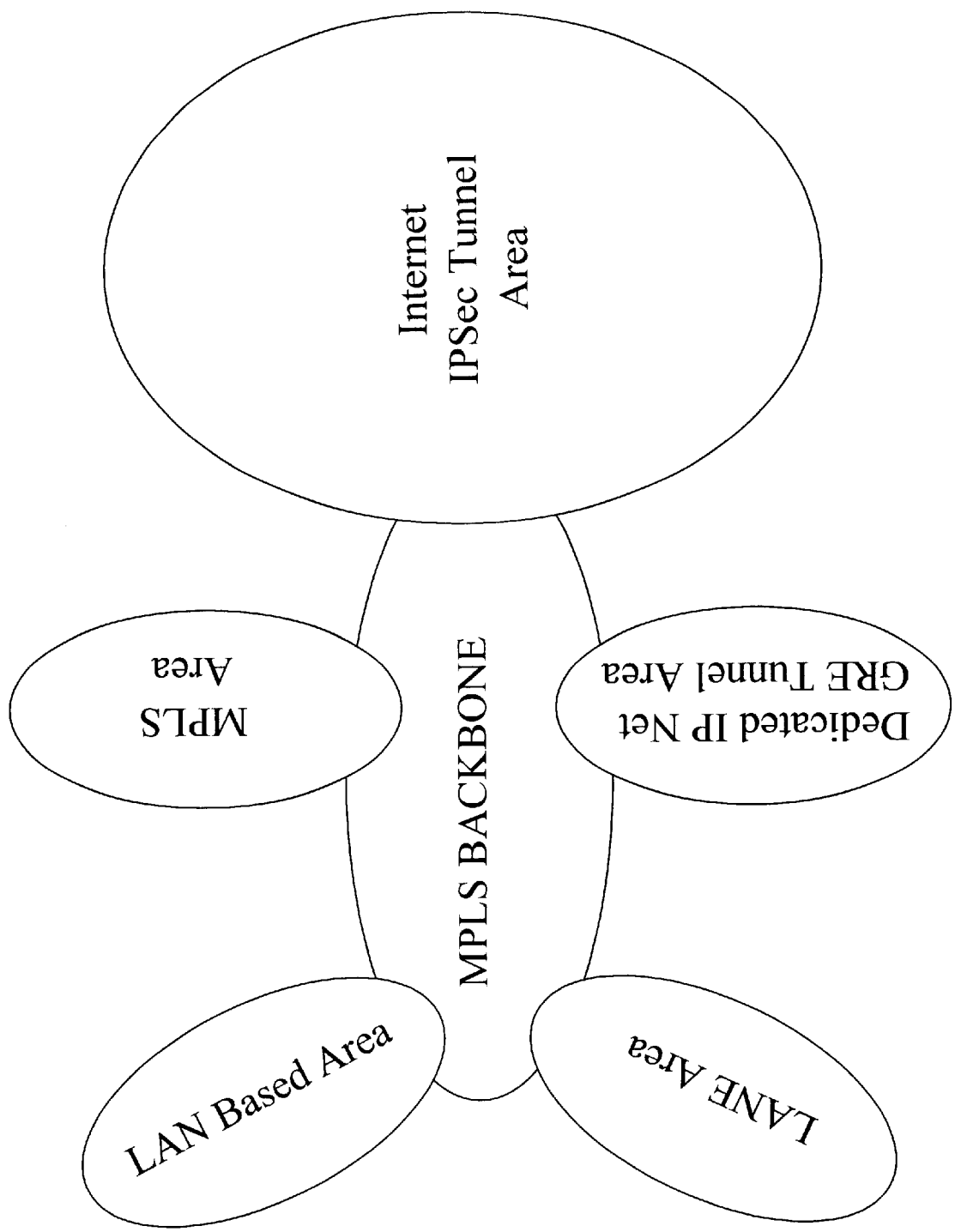

VPN areas could be employed to cater to administrative boundaries. For example a group of network providers may band together to offer a combined IP VPN service, however each may also wish to retain control of the private networks they serve. They may enter into transit and peering agreements to offer a seamless IP VPN service within their combined geographical area of coverage. However, the service offered to private networks may also be restricted to a single VPN area in return for a lower fee collected just by the operator of that area. Each of the network operators may operate different base networks, tunnel mechanisms, etc. within their own VPN areas (As illustrated in FIG. 3).

A single provider or multiple providers acting in concert could also introduce VPN areas to establish rate boundaries based on country, state, province, or some other geographic region to support charging different rates for inter-region traffic and intra-region traffic.

Quality of Service may also vary in different VPN areas. A provider may wish to offer service level agreements relating to delay, packet loss etc. for IP VPN service where the parameters are different for different VPN areas. For example a provider could treat his/her shared network as one VPN area and the Internet as another area. For IP VPN traffic confined to the shared network, the provider may be able to offer fairly tight service guarantees, by means of the technologies employed, network topology and traffic engineering. But if a private network has some remote sites which could not practically connect directly to the provider's network, the provider could connect these sites to the IP VPN by setting up tunnels to them over the Internet.

VPN areas also provide a framework for addressing traffic engineering and scalability concerns. The load from different VPNs can be allocated to different routers. If the routing regimes being used in a VPN provide equal cost path routing then there can be load sharing within a VPN through multiple gateway routers (also referred to as shared or border routers).

Multiple gateway routers provide automatic resilience, and while packets are in tunnels (i.e. encapsulated), they do not have to carry expensive to process source route headers.

As for scalability, few, if any base networks can support an unlimited number of tunnels. For example, if the tunnel mechanism is Virtual Circuits on a base Frame Relay network the total number of tunnels will depend of the number of DLCI's that can be supported on shared Frame Relay links. Efficient use of VPN areas can reduce the number of tunnels needed, permitting the support of more VPNs, serving more private networks.

Scalability concerns also arise in the exchange of reachability information for VPNs. Simple reachability exchange mechanisms do not scale to cover large VPNs with potentially more than a single link per private network. Virtual Routers (VR) address this problem by using full routing protocols for reachability information exchange. A VR is a forwarding control process in a VBR, dedicated to one IP VPN. It participates directly in routing information exchanges with other VRs dedicated to the VPN, over tunnels of that VPN. The routing exchanges relate only to the IP address space of the private network. The routing regime used can be specific to individual VPNs (e.g. small one might use RIP while larger ones use OSPF). A VR may use different routing protocols on each of its interfaces. It could theoretically exchanging routing information with all of a private network's routers (e.g. if the entire private network was one OSPF area). Alternatively the routing regime on stub links could be isolated to just the edge VBR and the attached Enterprise edge router. Further, VPN areas significantly reduce the number of peers with which VRs must exchange Intra VPN reachability information. This allows border routers to support more VPNs with less routing packet exchange overhead.

While gateway routers could become bottlenecks, this problem can be engineered away, since different VPNs can be assigned to different gateway routers. The resulting spreading of the load through multiple gateways may be an improvement over a single VPN area wherein the base network routing regime sent all traffic between two regions through one gateway.

The first IP device in the path between a private network and the provider's shared network will be referred to as a VPN Border Router (VBR). VBRs are located at the edge of VPN areas and serve as tunnel entrance and exit points for private network IP traffic. In multi VPN area networks they may also serve as the gateway device between VPN areas. Each VPN area contains interconnected VBR and non-edge routers/nodes.

There are two categories of VBRs including whether they serve a single VPN or multiple VPNs and whether they are edge, gateway or special. VBRs serving a single VPN may be located at the customer's location, at a POP or some other reasonable location. Shared VBRs however, should be located at a provider POP although it is conceivable that they could be located elsewhere. A VPN area can contain both shared and exclusive VBRs. It is a provider's choice as to whether to deploy all POP based shared VBRs, customer located exclusive VBRs or a mixture of both.

VBR functions can also be labeled as edge, gateway or special. A VBR need not be dedicated to only one of these functions. The edge function involves the serving of one or more private networks. The gateway function involves attaching two or more VPN areas. They may also connect a VPN area to other types of networks. Special functions include: Internet Attachment (Private Network access to the Internet may be offered as an extension of IP VPN service and be implemented by a special VBR that performs firewall (and, if needed, NAT) functions), Virtual Private Dial Network Attachment (Dial-in users may be connected directly to the IP VPN, instead of terminating on a home gateway at a particular private network; i.e. the VBR acts like a Remote Access Server or as a home gateway); and VPLS Interworking (there are many similarities between Virtual Private LAN Subnet service and IP VPN service. A provider may offer both, in particular some private network may connect to a VBR over virtual private LAN subnet (or even a real LAN subnet)). Minor changes in VBR edge functionality are required to handle this interworking.

A VBR serves a particular VPN if it terminates one or more stub links to private networks of that VPN. A gateway VBR that straddles two or more VPN areas serves a particular VPN if it forwards traffic for that VPN between the areas.

A provider or consortium thereof wishing to offer IP VPN service using multiple VPN areas must decide on the basis for partitioning their network and then configure VBRs to realize the desired VPN areas. If the basis for VPN areas relates to base network technology then the partitioning process will be straightforward: gateway VBRs will be deployed with separate interfaces to two or more base networks. If the deployment of multiple VPN areas is being driven by scalability or administrative domain concerns, and if the base network is common to all the VPN areas, then particular care will be needed in configuring the interfaces of gateway VBRs. An interface's type or network address may not be enough to determine which VPN area it participates in. A VPN area Identifier may need to be introduced to facilitate configuring gateway VBRs in this situation.

Gateway VBRs may serve large numbers of VPNs. Within each VBR there may be a forwarding table for each IP VPN supported by that VBR. This information could also be located at some central location or at various centralized locations. The forwarding control process operates in the private network address space. When packets arrives at a gateway VBR the VBR will select the correct forwarding table based upon the identity of the incoming tunnel. The forwarding table will then determine the tunnel on which packets should be sent out (suitably encapsulated for the tunnel selected).

There has been basically two approaches advocated for dynamically constructing and maintaining forwarding tables in IP VPNs: Intra VPN reachability information being piggy backed on routing exchanges taking place in the base network and employing VRs. When the tunnel topology within a VPN area is a full mesh a VR sees the VRs of all other VBRs in its VPN area as neighbors. From the perspective of the IP VPN routing, all its VRs in a VPN area are a single hop from each other. VRs in different VPN areas are two or more hops away.

Because arbitrary topologies and interconnections of VPN areas is supported by the present invention, the preferred embodiment employs VRs as the mechanism for constructing and maintaining forwarding tables in VBRs. However the power of the VPN area concept is that within one IP VPN service it would permit one VPN area to disseminate intra VPN reachability information using base network routing exchange piggybacking and another area to use virtual routers. However it should be noted that piggybacking may require modifying routing protocols and that there are scoping issues to address, while VRs run their routing protocols unmodified and secure.

Figure 1:
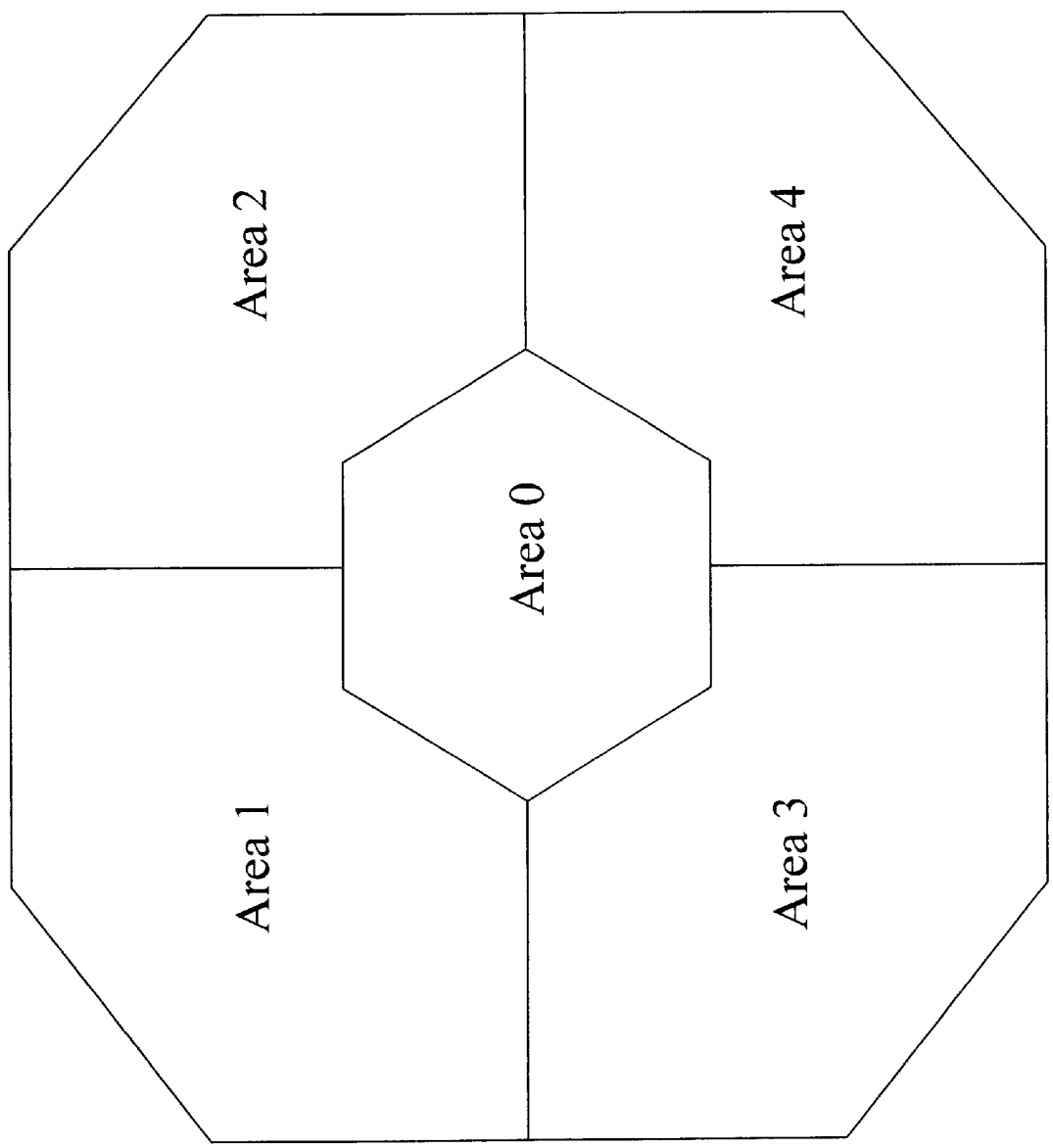
FIG. 1 depicts a block diagram of a shared network partitioned into five areas in accordance with the invention.

FIG. 1 shows a partitioning of a shared network into 5 VPN areas. Those skilled in the art will recognize that while 5 areas are illustrated, the network could be partitioned into different numbers of areas. Further, the illustrated shapes of the networks is not important.

Figure 2:
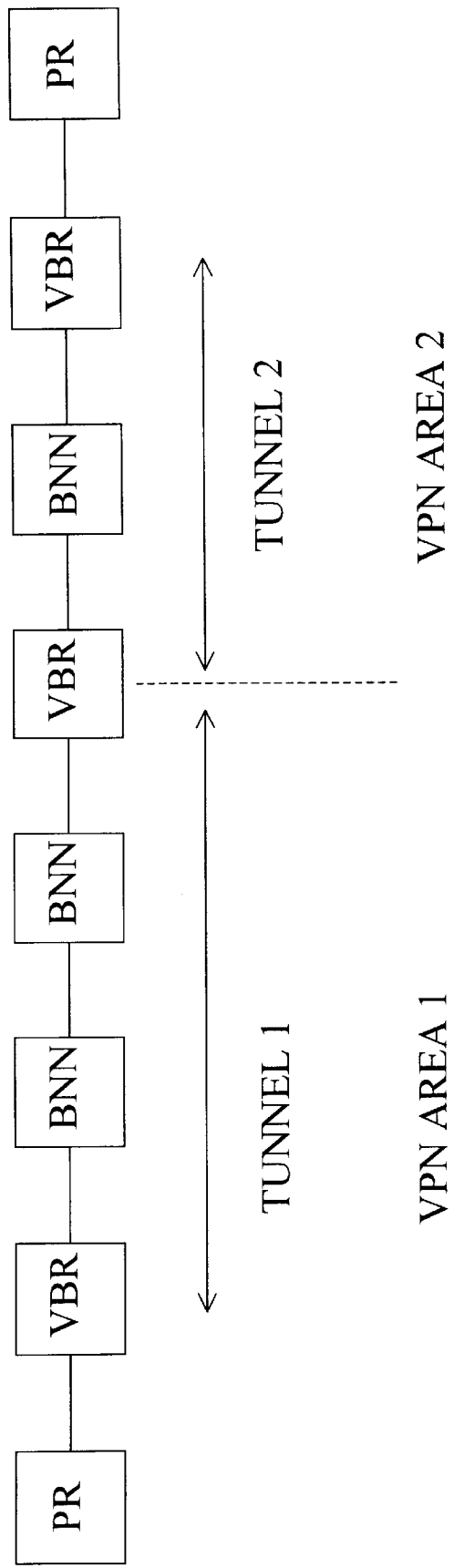
FIG. 2 depicts a block diagram of a communication path across two areas depicted in FIG. 1; and, FIG. 3 depicts a block diagram of a shared network partitioned into areas in accordance with the invention illustrating different network protocols in each area.

FIG. 2 illustrates a communication path between two private networks which traverses two VPN areas. Each VPN area is bordered by VBRs and contains other nodes that operate as part of the base network but are unaware of the IP VPN service because private network traffic is tunneled through them. (The term tunnel is being used here to mean any mechanism that encapsulates enterprise IP packets and carries a demultiplexing identifier that VBRs use to separate out IP packets of the different VPNs: a layer 2 virtual circuit is a tunnel in this sense).

All but the smallest of private networks will interface to the provider's network from a private router over a "stub" link. Some larger private networks may have multiple links, from the same or different private network routers, to the same VBR or to different VBRs. In some situations, a private network may have stub links to VBRs in different VPN areas.

A form of VPNID is used in the VPN membership dissemination operation. Typically, this form of VPNID, which we call the local VPNID, has only to be unique within a VPN area. To facilitate re-engineering of VPN areas any VPNID used should be unique within an Autonomous System.

A provider whose base network spans multiple VPN areas will need to decide if the IP VPN service offered to a particular private network will be confined to a single area or span multiple VPN areas. The provider enables the latter by configuring VRs for the new IP VPN in gateway VBRs. These VRs will be informed of the routing regime they are to participate in and they will need a router number and/or IP address assignment from the private network IP space. If there is to be chain of trust between the VRs dedicated to the VPN (preferably) then appropriate credentials should also be administered. Finally, the VR will be configured with a local VPNID for use in each VPN area it is configured to operate in.

Once this configuration has been done, the gateway VBR is able to participate in the VPN membership dissemination process with the other VBRs in each of the VPN areas it is attached to. The VPN membership dissemination mechanism may be different in each VPN area, but the end result is that each VR dedicated to a particular VPN (i.e. assigned the same VPNID) has enough information to establish tunnels to all other VRs of that VPN, within that VPN area.

Within each VPN area, a VPN area specific mechanism is then used to establish tunnels between all VRs serving the particular IP VPN. All private network traffic travels across a VPN area in a single tunnel hop. Traffic traveling between VPN areas is forwarded by VRs in the gateway VBRs that have been configured to be part of the VPN.

One special case stands out though: a topology of a two level hierarchy of a core and stub VPN areas. Each gateway VBR between stub and core could cache the VPN membership announcements that it receives on its stub side and relay them over the core. If there were a matching VPNID from another gateway VBR then both would initialize a VR, and establish a tunnel between them. The new VRs would also announce their presence on the stub network to complete the VPN tunnel connectivity.

In each VPN area a different tunneling mechanism choice may be in effect, depending on the base network. For example in one VPN area tunnels may be realized by GRE over a base network that is IP and in another tunnels may be realized by ATM SVCs over a base network that is ATM. The VRs in gateway VBRs transfer traffic between tunnels. However, for individual base network/tunnel mechanisms, it may be possible to establish tunnels right through VBRs.

It is preferable that within a VPN area all VRs (for a particular VPN) are fully meshed by tunnels. One of the advantages of VRs is that this assumption can be relaxed if it makes topological sense, however establishing an arbitrary tunnel topology within a VPN area could require administrative intervention.

The existence of multiple VPN areas should not be directly visible to the enterprise edge routers, nor should it affect mechanism for exchanging reachability information between a (VR in an) edge VBR and the enterprise site. It is beneficial for the protocol used to exchange of reachability information across a stub link to be independent of the intra VPN reachability exchange protocol between VBRs, and for it to be alterable on a private network by private network basis.

However VPN areas enable more complex stub link connectivities, such as multiple links from a private network to different VPN areas. VBRs will have to push routing hop information to the private network routers if loops and sub optimal forwarding are to be avoided. Thus, the most general mechanism for the VBR to learn the set of address prefixes that are reachable over the (stub) link and for the enterprise site to learn what addresses it should forward over a stub link, is for the private network edge routers and the VPN VRs to participate in the same routing regime.

Each VPN area may have a different mechanism for the dissemination of VPN membership. Thus, the existence of new sites need only be propagated to the VBRs within a VPN area. However, other VBRs will learn the reachability information for the new site through the routing protocol exchanges of the IP VPN. First, the VRs within a VPN area discover each other and the mesh of tunnels between them is established. VRs can then exchange routing information with their neighbors within the VPN over the tunnels. A gateway VR that straddles VPN areas may then convey the new routing information across the VPN area boundary, to all of its neighbors in the other VPN area.

When a private network wants to obtain an IP VPN service from a provider the provider must allocate a VPNID and then provision the stub links between a private network and one or more VBRs. The provider must provide a VR at each VBR that has stub links terminating on it for the new IP VPN. This involves assigning the VR an IP address, or router number, out of the private network address space, in addition to assigning IP addresses for each stub link terminating on the VR. A routing protocol process needs to be provided for each stub link, plus one for the tunnels that will be established between VRs.

The provider must determine the scope of the IP VPN service, and, if it is to cross multiple VPN areas, choose gateway VBRs on which to provide VRs for VPN. With the VRs in place automatic tunnel establishment can proceed, resulting in tunnel meshes within VPN areas and the provider chosen connectivity between areas.

If the chosen routing protocol on tunnel links permits auto-discovery of routers, then each of the routing processes will discover each other by exchanging messages over the tunnels. After this, the VRs are able to forward enterprise traffic between all sites in the VPN.

It will thus be seen that the invention efficiently attains the objects set forth above, among those made apparent from the preceding description. In particular, the invention provides a partitioned shared network for providing virtual private networks and methods of configuring the same. Those skilled in the art will appreciate that the configuration depicted in FIGS. 1–3 discloses a shared network which allows the implementation of separate networks over common infrastructure while providing security, scalability and performance to each network.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A virtual private network infrastructure which enables private network communications over a shared network comprising:

a shared network partitioned into at least two separate areas;

a first router coupled to a first of said areas and configured to distribute first router VPN information across said first area, wherein said first router VPN information includes a VPN identifier which is assigned to said first router;

a second router coupled between said first area and a second of said at least two areas and configured to distribute second router VPN information across said first area; wherein said second router VPN information includes a VPN identifier which is assigned to said second router; and, wherein said VPN identifier assigned to said first router is the same as said VPN identifier assigned to said second router.

2. A virtual private network infrastructure which enables private network communications over a shared network comprising:

a shared network partitioned into at least two separate areas;

a first router coupled to a first of said areas and configured to distribute first router VPN information across said first area, wherein said first router VPN information includes a VPN identifier which is assigned to said first router;

a second router coupled between said first area and a second of said at least two areas and configured to distribute second router VPN information across said first area; wherein said second router VPN information includes a VPN identifier which is assigned to said second router;

wherein said VPN identifier assigned to said first router is the same as said VPN identifier assigned to said second router; and a third router coupled to said second area and configured to distribute third router VPN information across said second area, wherein said third router VPN information includes a VPN identifier which is assigned to said third router, said second router being further configured to distribute said second router VPN information across said second area, VPN identifier assigned to said third router being the same as said VPN identifier assigned to said second router.

3. The virtual private network infrastructure according to claim 2 wherein said distribution of information by each of said routers is dynamic.

4. A virtual private network infrastructure which enables private network communications over a shared network comprising:

a shared network partitioned into at least two separate areas;

a first router coupled to a first of said areas and configured to distribute first router VPN information across said first area, wherein said first router VPN information includes a VPN identifier which is assigned to said first router;

a second router coupled between said first area and a second of said at least two areas and configured to distribute second router VPN information across said first area; wherein said second router VPN information includes a VPN identifier which is assigned to said second router, said VPN identifier assigned to said first router being the same as said VPN identifier assigned to said second router;

a first private network adaptation device selectively coupleable to said first router; and, a second private network adaptation device selectively coupleable to said third router;

wherein when said first private network adaptation device is coupled to said first router, and said second private network adaptation device is coupled to said third router said first private network adaptation device may communicate with said second private network adaptation device.

5. The virtual private network infrastructure according to claim 1 wherein said second router is virtual.

6. The virtual private network infrastructure according to Clam 4 wherein said first and third routers each are virtual.

7. The virtual private network infrastructure according to claim 1 wherein said first area operates using a first network protocol and a said second area operates using a second network protocol.

8. The virtual private network infrastructure according to claim 7 wherein said first network protocol is a protocol selected from the group consisting of MPLS, ATM, IP, Frame Relay, Local Area Network Emulation, GRE, L2TP, IPSec, and ethernet.

9. The virtual private network infrastructure according to claim 7 wherein said second network protocol is a protocol selected from the group consisting of MPLS, ATM, IP, Frame Relay, Local Area Network Emulation, GRE, L2TP, IPSec, and ethernet.

10. The virtual private network infrastructure according to claim 1 wherein said distribution of information by each of said routers is dynamic.

11. The virtual private network infrastructure according to claim 1 wherein:

said second of said at least two areas is the Internet; and said second shared network router is configured to provide firewall services to said first of at least two areas.

12. A virtual private network infrastructure which enables private network communications over a shared network comprising:

a shared network partitioned into at least two separate areas;

a first router coupled to a first of said areas and configured to distribute first router VPN information across said first area, wherein said first router VPN information includes a VPN identifier which is assigned to said first router;

a second router coupled between said first area and a second of said at least two areas and configured to distribute second router VPN information across said first area; wherein said second router VPN information includes a VPN identifier which is assigned to said second router, said VPN identifier assigned to said first router being the same as said VPN identifier assigned to said second router;

a third router coupled to said first of said areas configured to route communications between a dial-up network and said first router;

wherein said VPN identifier assigned to said first and second routers is assigned to said third router.

13. A virtual private network infrastructure which enables private network communications over a shared network comprising:

a shared network partitioned into at least two distinct areas;

first router means coupled to a first of said areas for dynamically distributing first router means VPN information across said first area, wherein said first router means VPN information includes a VPN identifier which is assigned to said first router means;

a second router means coupled between said first area and a second of said areas for dynamically distributing second router means VPN information across said first and second areas; wherein said second router means VPN information includes a VPN identifier which is assigned to said second router means; and, wherein said VPN identifier assigned to said first router means is the same as said VPN identifier assigned to said second router means.

14. A virtual private network infrastructure which enables private network communications over a shared network comprising:

a shared network partitioned into at least two distinct areas;

first router means coupled to a first of said areas for dynamically distributing first router means VPN information across said first area, wherein said first router means VPN information includes a VPN identifier which is assigned to said first router means;

a second router means coupled between said first area and a second of said areas for dynamically distributing second router means VPN information across said first and second areas; wherein said second router means VPN information includes a VPN identifier which is assigned to said second router means, said VPN identifier assigned to said first router being the same as said VPN identifier assigned to said second router means; and third router means coupled to said second area for dynamically distributing third router means VPN information across said second area, wherein said third router means VPN information includes a VPN identifier which is assigned to said third router means; and, wherein said VPN identifier assigned to said third router means is the same as said VPN identifier assigned to said second router means.

15. A virtual private network infrastructure which enables private network communications over a shared network comprising:

a shared network partitioned into at least two distinct areas;

first router means coupled to a first of said areas for dynamically distributing first router means VPN information across said first area, wherein said first router means VPN information includes a VPN identifier which is assigned to said first router means;

a second router means coupled between said first area and a second of said areas for dynamically distributing second router means VPN information across said first and second areas; wherein said second router means VPN information includes a VPN identifier which is assigned to said second router means, said VPN identifier assigned to said first router being the same as said VPN identifier assigned to said second router means;

first private router means, selectively coupleable to said first router means, for routing communications to a node on a private network attached thereto; and second private router means, selectively coupleable to said third router means, for routing communications to a node on a private network attached thereto;

wherein when said first private router means is coupled to said first router means, and said second private router means is coupled to said third router means said first private router means may communicate with said second private router means.

16. A method of configuring a virtual private network infrastructure which enables private network communications over a shared network comprising:

partitioning a shared network into a plurality of areas;

coupling a virtual router between at least two of said plurality of areas;

assigning at least one VPN identifier to said virtual router;

creating a link between a first private network router and a first shared network router, wherein said first shared network router is coupled to a first of said at least two of said plurality of areas;

assigning said at least one VPN identifier to said first shared network router;

communicating said VPN identifier between said first shared network router and said virtual router.

17. A method of configuring a virtual private network infrastructure which enables private network communications over a shared network comprising:

partitioning a shared network into a plurality of areas;

coupling a virtual router between at least two of said plurality of areas;

assigning at least one VPN identifier to said virtual router;

creating a link between a first private network router and a first shared network router, wherein said first shared network router is coupled to a first of said at least two of said plurality of areas;

assiging said at least one VPN identifier to said first shared network router;

communicating said VPN identifier between said second shared network router and said virtual router.

creating a link between a second private network router and a second shared network router, wherein said second shared network router is coupled to a second of said at least two of said plurality of areas;

assigning said at least one VPN identifier to said second shared network router;

communicating said VPN identifier between said second shared network router and said virtual router.

18. The method of configuring a virtual private network infrastructure according to claim 17 further comprising:

said first private router transmitting a communication to said first shared network router, wherein said communication is intended for said second shared network router;

said first private router receiving said communication and encapsulating said communication in accordance with a tunneling protocol specific to said first of said at least two of said plurality of areas;

said first shared network router forwarding said encapsulated communication to said virtual router;

said virtual router receiving said communication from said first shared network router, deencapsulating said communication and re-encapsulating said communication in accordance with a tunneling protocol specific to said second of said at least two of said plurality of areas;

said virtual router forwarding said re-encapsulated communication to said second shared network router.

* * * * *